3,516,984
PROCESS FOR MANUFACTURING O-β-HYDROXY-
ETHYL ETHERS OF RUTIN
Pierre Courbat, Nyon, Switzerland, assignor to
Zyma S.A., Nyon, Switzerland
No Drawing. Continuation-in-part of application Ser. No.
439,946, Mar. 15, 1965. This application Nov. 6, 1967,
Ser. No. 681,025
Claims priority, application Switzerland, Mar. 26, 1964,
4,014/64
Int. Cl. C07c 47/18
U.S. Cl. 260—210                                    5 Claims

ABSTRACT OF THE DISCLOSURE

Ethers of O-β-hydroxyethyl-rutin are produced in a two-step process with a greatly reduced quantity of solvent as compared to the known processes. In the first step, one mole of rutin, two moles of sodium hydroxide, and two moles of ethylene chlorohydrin are mixed in a medium which is at least 80% by volume of ethanol. In the second step, at least one mole of sodium hydroxide and at least one mole of ethylene chlorohydrin are added to the reaction mixture obtained by the first step.

---

This invention relates to an improved method for manufacturing O-β-hydroxyethyl ethers of rutin having useful pharmacological properties and which are soluble in water in any proportion.

The present application is a continuation-in-part of my copending application Ser. No. 439,946 filed Mar. 15, 1965 and now abandoned.

Rutin is one of the components of vitamin P but has the disadvantage that it is practically insoluble in water (only 0.013% soluble in cold water and 0.5% in boiling water). Rutin may be described as the 3-rutino-side of 3,3',4',5,7-pentahydroxyflavone and has the following structure:

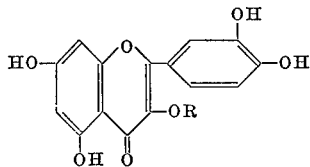

where R represents the sugar rutinose which is a disaccharide formed from a molecule of rhamnose and a molecule of glucose.

The mixture of rutin ethers obtained according to the present invention has a very low toxicity; although it has not been possible to determine the DL 50 orally, doses as high as 45 g./kg. in rats and 22.5 g./kg. in guinea pigs have been shown to be nonlethal. It has been found that the mixture of ethers has the following pharmacological properties; it exerts a normalising effect on capillary permeability, capillary resistance is increased, it has a haemostatic action and an antiinflammatory action.

There are many applications of the ethers in medicine, inter alia for treatment of circulatory disorders and capillary deterioration.

According to the present invention, the process for manufacturing O-β-hydroxyethyl ethers of rutin comprises reacting at a temperature of at least 45° in a first step 1 mole of rutin, 2 moles of sodium hydroxide and 2 moles of ethylene chlorohydrin in a medium which contains at least 80% by volume of ethanol, and then reacting in a second step at least 1 mole of sodium hydroxide and at least 1 mole of ethylene chlorohydrin with the intermediate product obtained by the first step.

Rutin (which has four free phenolic hydroxy groups in its molecular structure) is converted to its disodium salt by the sodium hydroxide in the first stage; since this salt is soluble in the ethanolic reaction medium it can react with 2 moles of ethylene chlorohydrin. Since the monosodium salt and also the trisodium and tetrasodium salts of rutin, are practically insoluble in ethanol, even in hot ethanol, their etherification is impossible.

During the second stage, the tri-β-hydroxyethyl ethers are formed as a result of the reaction of the third molecule of sodium hydroxide and the third molecule of ethylene chlorohydrin with a third phenolic hydroxy group.

The reaction is preferably carried out under reflux. After cooling of the reaction medium the latter is acidified to the range where bromophenol blue turns over, i.e., a pH of 2 to 5.

U.S. Pat. No. 2,975,168 discloses a process for producing a tri-(β-hydroxyethyl) ether of rutin, which comprises reacting rutin at an elevated temperature with at least three molecular proportions of ethylene chlorohydrin in the presence of at least three molecular proportions of an alkali. This known process is carried out in water. When carried out on an industrial scale, large amounts of water are necessary, the handling of which is cumbersome.

Therefore, the problem was to replace the water by another solvent. A relatively cheap solvent fulfilling this condition is ethanol. When using ethanol, only one half of the amount of solvent is necessary than when working with water. However, the known method disclosed in U.S. Pat. No. 2,975,168 cannot be carried out in ethanol, as the addition of at least three moles of ethylene chlorohydrin to rutin dissolved in ethanol, in the presence of at least three moles of an alkali, does not produce rutin ethers at all but only unvaluable side-products.

It has now surprisingly been found that the reaction between rutin and three moles of ethylene chlorohydrin can be carried out in ethanol or in a medium containing at least 80% by volume of ethanol, if one proceeds in two steps according to the present invention. Thus, when proceeding in two steps, the desired rutin ethers are obtained in good yield while the advantage of working in concentrated solution is also realized. This means that only half the amount of solvent must be handled than in the known process.

The present process gives a mixture of O-β-hydroxyethyl ethers, comprising 4'-mono-O-β-hydroxyethyl-rutin, 7,4'-O-β-hydroxylethyl-rutin, 7,3',4'-tri - O - β - hydroxyethyl-rutin, 5,7,4'-tri-O-β-hydroxyethyl-rutin, and 5,7,3',4'-tetra-O-β-hydroxyethyl-rutin.

These ethers may be present in the following proportions:

4'-mono-O-β-hydroxyethyl-rutin from 4 to 16%, especially from 5 to 8%
7,4'-di-O-β-hydroxyethyl-rutin from 7 to 15%, especially from 8 to 12%
7,3',4'-tri-O-β-hydroxyethyl-rutin from 55 to 75%, especially from 60 to 65%
5,7,4'-tri-O-β-hydroxyethyl-rutin from 5 to 15%, especially from 5 to 8%
5,7,3',4'-tetra-O-β-hydroxyethyl-rutin from 5 to 15%, especially from 7 to 10%.

The percentages quoted above are all by weight of the final composition.

The process of the invention guarantees the constancy of qualitative and quantitative composition of the mixture within the above limits.

The above mixture of ethers is a light yellow powder which is slightly hygroscopic and which is very soluble in water, methanol, glycerin, propylene glycol and slightly soluble in hot ethanol from which it precipitates on cooling in the form of an amorphous substance. It is practically insoluble in ether, benzene, chloroform, ethyl acetate and aromatic hydrocarbons generally. In distilled water the ultraviolet spectrum shows two absorption bands: one at 350 mμ and the other at 253 mμ; in 96% ethanol these bands are at 356 mμ and 255 mμ respectively. The product obtained melts between 165 and 168° C. on a Maquenne block with decomposition.

The following is an example illustrating the manner in which the ether mixture may be prepared:

610 g. (1 gram mole) of rutin are introduced with agitation into 850 ml. of ethanol. The mixture is stirred vigorously to homogenise the suspension and approximately 120 ml. of ethanol are distilled off in vacuo. The mixture is heated slowly between 50 and 55° C. and 80 g. (2 gram moles) of sodium hydroxide, in the form of a 30% aqueous solution, are introduced. The rutin slowly dissolves in the form of its disodium salt. The solution is heated slowly to reflux temperature with the gradual introduction of 161 g. (2 gram moles) of ethylene chlorohydrin. 41.5 g. (1.04 gram moles) of sodium hydroxide in a 30% aqueous solution and 92 g. (1.14 gram mole) of ethylene chlorohydrin are then introduced successively. Reflux is maintained with vigorous agitation for at least two hours. The solution is cooled to room temperature, acidified to a pH of 4 with hydrochloric acid and then filtered to eliminate impurities and is then evaporated to dryness.

The product can be purified either in an aqueous medium by means of ion exchangers or by precipitation from an ethanolic medium in accordance with the following method: the dry residue obtained by evaporation is taken up in hot ethanol (proportion 1:2 weight in grams of rutin/volume in ml. of ethanol) which dissolves the hydroxyethyl ethers and leaves the substantially insoluble sodium chloride as a residue. The hot alcoholic solution is left to stand, then decanted and placed in a refrigerator during which time the reaction product is precipitated. The latter is taken up in distilled water. The aqueous solution is evaporated and the product is dried. It can then be ground, pulverised and screened as required.

What I claim is:

1. Process for manufacturing ethers of O-β-hydroxyethyl-rutin, which comprises reacting in a first step 1 mole of rutin, 2 moles of sodium hydroxide and 2 moles of ethylene chlorohydrin in a medium which contains at least 80% by volume of ethanol, and then reacting in a second step at least 1 mole of sodium hydroxide and at least 1 mole of ethylene chlorohydrin with the intermediate product obtained by the first step.

2. Process according to claim 1, wherein after the second step the ethanolic solution is acidified at a pH of 2 to 5.

3. Process according to claim 1, wherein in the first step 1 mole of rutin is introduced in said ethanolic medium, whereafter 2 moles of sodium hydroxide in aqueous solution are added to the ethanolic dispersion of rutin, and then 2 moles of ethylene chlorohydrin are added to the solution thus obtained.

4. Process according to claim 1, wherein in the second step 1 mole of sodium hydroxide in aqueous solution and 1 mole of ethylene chlorohydrin are successively added to the reaction mixture obtained by the first step.

5. Process according to claim 1, wherein in the second step more than 1 mole of sodium hydroxide in aqueous solution and more than 1 mole of ethylene chlorohydrin are added to the reaction mixture obtained by the first step.

References Cited

UNITED STATES PATENTS 2,975,168  3/1961  Favre.
3,346,559  10/1967  Klosa _____ 260—210

LEWIS GOTTS, Primary Examiner

J. R. BROWN, Assistant Examiner

U.S. Cl. X.R.

424—180